June 8, 1937.  E. H. BRAYER  2,082,788

METER

Filed June 13, 1935  3 Sheets-Sheet 1

INVENTOR
Edward Harold Brayer
BY
Popp and Popp
ATTORNEY

June 8, 1937.   E. H. BRAYER   2,082,788
METER
Filed June 13, 1935   3 Sheets-Sheet 2
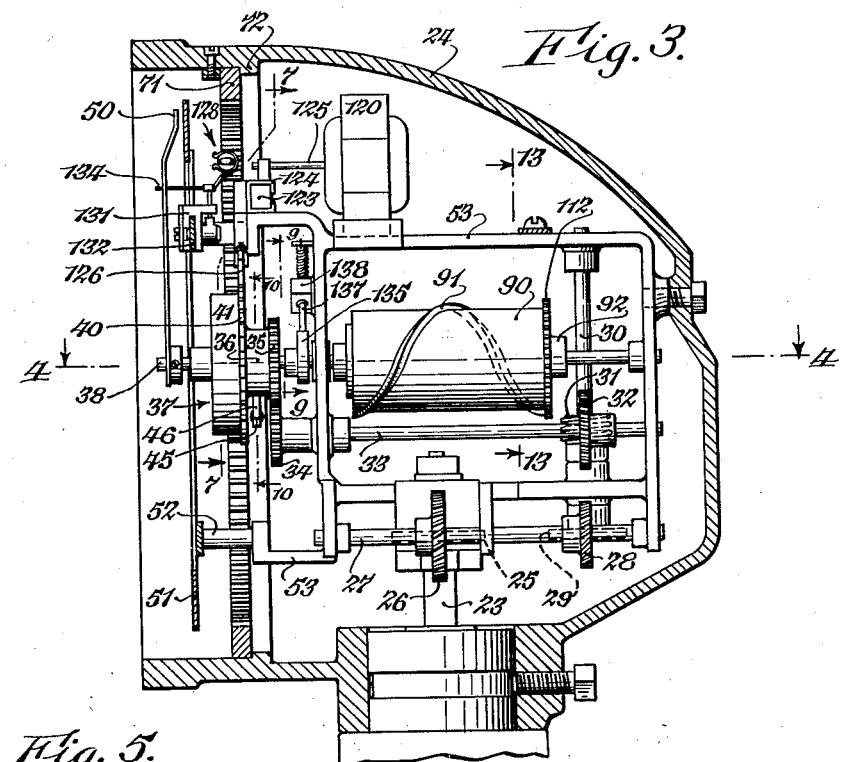
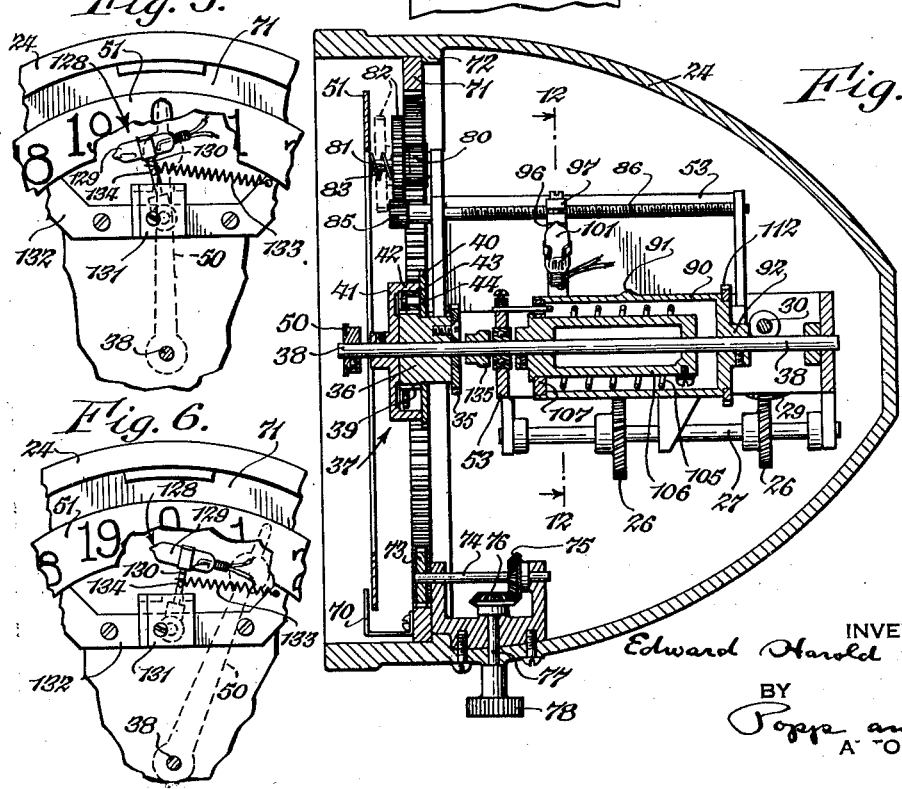
INVENTOR
Edward Harold Brayer
BY
Poppe and Poppe
ATTORNEY June 8, 1937.  E. H. BRAYER  2,082,788
METER
Filed June 13, 1935   3 Sheets-Sheet 3
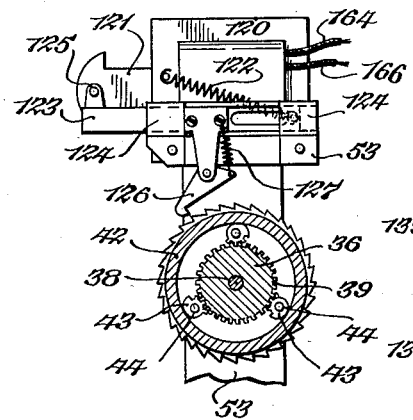
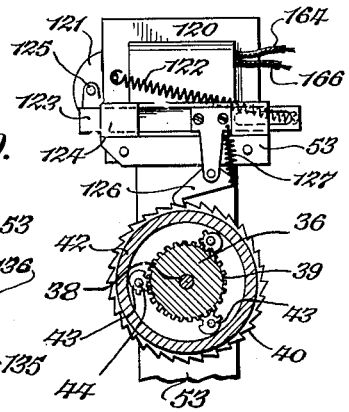
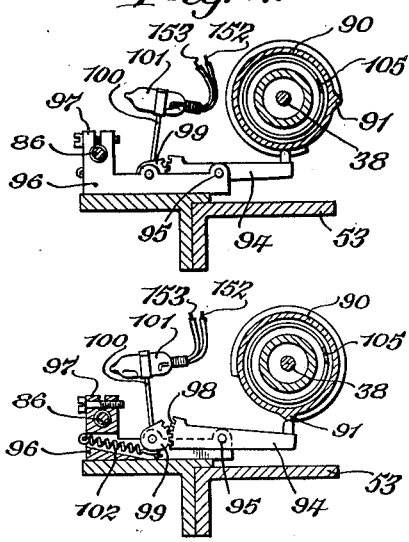
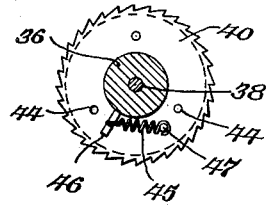
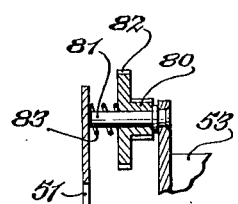
INVENTOR
Edward Harold Brayer
BY
Pozzo and Pozzo
ATTORNEY Patented June 8, 1937

2,082,788

UNITED STATES PATENT OFFICE 2,082,788

METER

Edward Harold Brayer, Buffalo, N. Y., assignor to Brayer Brothers Construction Corporation, Buffalo, N. Y., a corporation of New York Application June 13, 1935, Serial No. 26,428

14 Claims. (Cl. 221—101)

This invention relates to a meter and more particularly to a liquid metering system in which the operator sets the mechanism to deliver a definite quantity of liquid and in which, after this quantity of liquid has been delivered, the mechanism automatically stops the flow and can reset itself to its original condition. The meter shown is primarily designed for use in mixing hot asphalt compounds, the present application being an improvement upon the meter shown in my co-pending application Ser. No. 723,536.

As with my said co-pending application the invention is not limited to the particular field mentioned but has a wide range of uses, for example, in gasolene and oil service stations where it would enable the operator to take care of a number of pumps since after the operator sets each pump to the desired gallonage, a delivery of fuel or oil and the resetting of the mechanism is automatic. Further, the invention can be readily adapted to self-service gasolene or oil pumps by the addition of a coin controlled mechanism and the invention can also be used in filling containers with a definite volume of liquid and by the addition of further well known automatic mechanisms, such as photoelectric cells or timing mechanisms, could be adapted to continuously fill containers on a moving belt with definite volumes of liquid. The invention can also be employed in connection with the blending of gasolenes, lubricants and other liquids, blending being readily accomplished by having one or more meters made in accordance with the invention and delivering the liquids to be blended through a common discharge.

The invention can, also, obviously be used to measure the charges of water to a concrete mixer.

The principal object of the invention is to provide a simple, reliable, compact and accurate liquid meter which includes a dial and a preselector finger which can be set to any desired volume indication on the dial and which also includes means for automatically stopping the flow of liquid when the exact volume of fluid indicated by the preselector finger has been delivered and means for automatically resetting the meter indicating mechanism to zero after the preselected volume has been delivered.

Another object of the present invention is to provide a simple clutch which is positively released and which disconnects the indicator hand from the metering mechanism and permits a return spring to return the hand to zero.

A further aim of the present invention is to provide such a system in which parts of standard construction can be employed thereby enabling the system to be manufactured at low cost.

Another object of the present invention is to provide an automatic metering system of the character described which is compact in construction and is composed of relatively few moving parts and will operate efficiently to accurately deliver preselected quantities of liquid and will maintain its operating efficiency for a long period of time and under conditions of severe and continuous usage without getting out of order and requiring repair.

Another object of the present invention is to provide such a metering system which is conveniently adjustable throughout and in which, in particular, the relation between the preselector finger and the indicator hand and metering mechanism can be readily adjusted.

Another object of the present invention is to provide a simple rotating cam for stopping the metering mechanism and for returning the indicating hand to zero the moment that the preselected quantity of liquid has been delivered.

In the accompanying drawings:

Fig. 3 is a vertical central section through the metering mechanism shown in Fig. 1, parts being shown in elevation.

Fig. 4 is a horizontal section, taken on line 4—4, Fig. 3.

Figs. 5 and 6 are fragmentary views similar to Fig. 1 showing parts broken away and disclosing the operation of the zero limit switch, Fig. 5 showing this switch in its open position and Fig. 6 showing the switch in its closed position.

Figs. 7 and 8 are sections, taken along line 7—7, Fig. 3 and showing the clutch and operating mechanism therefor, this clutch disconnecting the metering mechanism from the indicator hand and permitting a spring mechanism to return the indicator hand to a zero position.

Fig. 9 is a fragmentary section, taken on line 9—9, Fig. 3 and showing the stop which fixes the zero position of the indicator hand.

Fig. 10 is a fragmentary vertical section, taken on line 10—10, Fig. 3 and showing the spring mechanism which normally holds the clutch in its locked position.

Figs. 11 and 12 are sections taken on line 12—12, Fig. 4 and showing the construction and operation of the preselector switch, Fig. 11 showing the switch in its closed position and Fig. 12 in its open position.

Fig. 13 is a fragmentary vertical section, taken on line 13—13, Fig. 3 and showing the governor which limits the speed of the return movement of the indicator hand by the spring.

Fig. 14 is a fragmentary horizontal section, taken on line 14—14, Fig. 1 and showing the manner in which the relation between the preselector mechanism and the metering and indicating mechanism can be conveniently adjusted.

Figure 1:
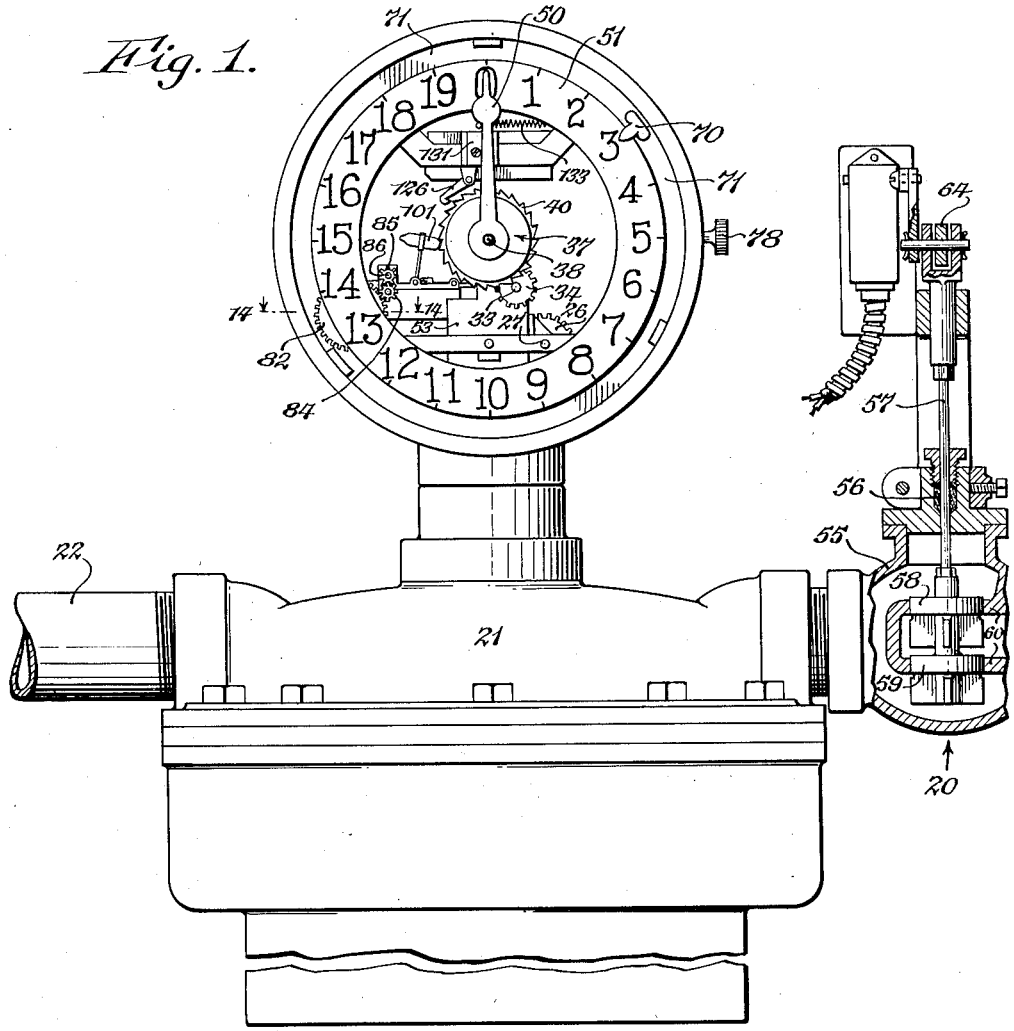
Fig. 1 is a front elevation of a meter embodying my invention showing a dial which is calibrated in gallons and having a standard indicating hand and also having a preselector finger mounted on a ring, the preselector finger being set to the volume desired to be metered out.

The material to be metered is admitted past a balanced valve indicated generally at 20 into a casing 21 and out through an outlet 22. The metering mechanism in the casing 21 can be of any suitabale form, the specific mechanism forming no part of the present invention and consequently not being shown. This mechanism is shown as driving a vertical shaft 23 which extends upwardly into a casing 24. This casing is shown as being mounted directly on the casing 21 but it will be understood that these two casings can be remote from one another and a suitable long drive provided between the mechanism in the casing 21 and the vertical shaft 23. It will also be understood that the casing 21 can be steam jacketed to permit of handling materials, such as asphalt, which are not normally in a liquid state. A gear 25 is fast to the upper end of the shaft 23 and this gear drives a gear 26 which is fast to a horizontal shaft 27 to which is also fixed a gear 28 driving a gear 29 on a vertical shaft 30, this shaft 30 carrying a worm 31 which drives a worm wheel 32 on a horizontal shaft 33. A gear 34 is fast to the other end of this shaft 33 and this gear drives a gear 35 secured to the rear end of a hub 36, this hub and gear forming the drive element of a clutch indicated generally at 37. This hub 36 is loosely mounted on the indicator shaft 38 of the meter and is formed at its front end to provide a gear 39. This hub 36 carries a ratchet disk 40 which is loosely mounted thereon between the gears 35 and 39 and is arranged against the rear ends of the teeth of the gear 39. The drive head 41 of the clutch is arranged in front of the hub 36 and is fast to the indicator shaft 38. This drive head is provided with a rearwardly projecting marginal flange 42, the inner cylindrical surface of which is engaged by cam faces of a plurality of segmental gears 43, three of these gears being shown and the teeth of these gears meshing with the teeth of the gear 39. These segmental gears 43 are mounted on small pins 44 which are secured in and project forwardly from the ratchet wheel 40, as best illustrated in Figs. 7, 8, and 10.

The segmental gears 43 are normally held in a position in which their cam faces are wedged against the inner face of the flange 42 by a spring indicated at 45 so that driving connection normally obtains between the head 41 which is fast to the indicator shaft and the hub and gear 36, 39 which is connected through the gearing previously described with the metering mechanism in the casing 21. This spring 45 is secured at one end to a pin 46 projecting radially downward from the hub 36 and at its other end to a pin 47 projecting rearwardly from the ratchet disk 40 and yieldingly urges the ratchet wheel to rotate relative to the hub and thereby turning the segmental gears 43 to their wedging position, indicated in Fig. 7.

At its front end the indicator shaft 38 carries an indicator hand 50 which traverses a dial 51, this dial being shown as being calibrated for gallons, although it will be understood that it can be calibrated for pounds, and being shown in the form of a ring supported on posts 52 extending forwardly from a bracket 53, this bracket also carrying the various shafts previously described.

It will therefore be seen that in the normal condition of the parts a direct drive is established from the mechanism in the casing 21 to the indicator hand 50 through the shaft 23, gears 25, 26, shaft 27, gears 28, 29, shaft 30, worm 31, worm wheel 32, shaft 33, gears 34, 35, hub 36, gear 39, segmental gears 43, clutch head 41 and the indicator shaft 38, so that as the metering mechanism in the casing 21 operates, the indicator hand 50 is moved along the calibrated dial 51 accordingly.

The fluid is supplied to the meter under pressure and the flow of this fluid is controlled by the balanced valve indicated generally at 20 and which may be located either ahead of or behind the meter, that is, controlling the flow of liquid to the meter or controlling the flow of liquid from the meter. The balanced valve 20 can be of any usual construction and as shown comprises a casing 55 which can, of course, be steam jacketed where extremely viscous materials are being handled. The valve casing 55 is shown as having the usual stuffing box 56 through which the valve stem 57 slides vertically. This valve stem carries a pair of heads 58 and 59 which open and close a pair of ports in an internal diaphragm 60 which extends across the interior of the valve housing. Suitable guides are provided for each of the valve heads and by the provision of the two valve heads, as shown, the valve is balanced, that is, there is no tendency for the pressure of the liquid to either open or close the valve inasmuch as the force of this pressure is balanced by its opposing effect upon the two valve heads.

The valve is opened and closed by means of a motor driven thruster indicated generally at 61, this thruster being of conventional construction and hence not being illustrated in detail. When the motor 62 of the thruster is energized, upward motion is imparted to a push rod 63 connected at its upper end to a lever 64, the other end of this lever being pivoted to the upper end of a link 65, this link being in turn pivoted to a stationary bracket 66 mounted on the valve housing 55. Intermediate its ends the lever 64 is pivotally secured, as indicated at 67, to the upper end of the valve rod 57. The valve 20 is normally held closed by a tension spring 68 which is connected at one end to the outer end of the lever 64 and at its other end to the housing 55 of the valve. It is therefore apparent that when the motor of the thruster is energized the outer end of the lever 64 will be lifted and the balanced valve 20 opened so as to admit fluid under pressure to the meter casing 21. Conversely, when the thruster motor is deenergized the spring 68 will draw the lever 64 downwardly thereby closing the valve and also returning the thruster to its normal inoperative condition.

Means are provided for preselecting the volume of liquid to be delivered by the meter and for this purpose a preselector finger 70 is provided which traverses the dial 51 and is set to the amount it is desired to have the meter deliver. For this purpose the preselector finger 70 is is mounted on an internal ring gear 71 which is held against a guide rib 72 of the casing 24. This ring gear 71 is driven during presetting operation, as best illustrated in Fig. 4, by a pinion 73 fast to a horizontal shaft 74, the other end of which carries a bevel gear 75 meshing with a bevel gear 76 on a horizontal shaft 77 which extends through the casing 24 and is turned by means of a knob 78 on the exterior of the casing. By turning the knob 78 the train of gears just described rotates the internal ring gear 71 so as to move the preselector finger 70 to any desired position about the calibrated dial 51.

As the internal ring gear 71 is so turned it rotates a pinion 80 which is loose on a pin 81 which projects forwardly from the stationary bracket 53 toward the calibrated dial 51. This pinion is formed integrally with a gear 82 and the pinion and gear 80, 82 are yieldingly held in their rearmost position on the pin 81 by means of a helical compression spring 83, the front end of this spring bearing against the rear side of the dial 51. The gear 82 meshes with a small intermediate pinion 84, shown in Fig. 1, which drives a pinion 85, the pinion 85 being fast to a screw shaft 86, this shaft being journaled in the bracket 53. Upon reference to Fig. 4 it will be observed that the pinion and gear 80, 82 can be drawn forwardly against the resistance of the spring 83 out of engagement with the small intermediate pinion 84. This release is provided so as to adjust the relation between the preselector finger 70 and the screw shaft 86.

Within the casing 24 a drum 90 having a helical cam screw 91 is secured to the indicator shaft 38. For this purpose the rear end of the drum 90 is formed to provide a hub 92 which is secured to the indicator shaft 38, the front end of the drum 90 being open. The helical cam screw 91 is adapted to engage a trip 94 which is pivoted at its center, as indicated at 95, to a slide or carrier 96, this slide or carrier being guided by the bracket 53 and being formed with a threaded bifurcated projection 97 engaging the screw shaft 86 so that as the screw shaft 86 is turned the carrier is moved along the bracket and the trip 94 is moved into the path of different portions of the screw cam 91. The trip 94 is formed at the opposite end from that engaging the screw cam 91 with teeth 98. The teeth 98 mesh with the teeth of a segmental gear 99 which is suitably mounted on the slide 96 and which carries a vertical post 100 on which the capsule of a Mercoid switch 101 is mounted. As best shown in Fig. 12 a spring 102 is provided which normally holds the Mercoid switch 101 in its closed position and also yieldingly holds the trip 94 against the cylindrical surface of the drum 90 from which it is moved upon engaging the screw cam.

When the indicator hand 51 comes into register with the preselector finger 70 the meter is stopped and the indicator hand is automatically returned to its zero position by a return spring 105 which is wound up during the metering operation and reacts to so return the indicator hand. One end of this spring 105 is fast to a drum 106 which in turn is fast to the indicator shaft 38 and the other end of this spring extends through an opening provided in a washer 107 which is loosely mounted in the open end of the drum 90, as best indicated in Fig. 4. The free end of the spring 105 is secured to the bracket 53, this portion of the bracket 53 also providing a bearing for the indicator shaft. Since one end of the spring 105 is connected to the stationary bracket 53 and the other end to the indicator shaft 38 it is apparent that during the metering operation the spring 105 is wound up so that its power can be utilized in returning the indicator hand to its zero position.

The action of the spring 105 in returning the indicator hand to its zero position is dampened by a governor indicated generally at 110 and best shown in Fig. 13. This governor can be of any suitable construction and is not illustrated in detail but preferably acts in one direction only and for this purpose the governor is driven through a ratchet mechanism 111 which is connected to the indicator shaft by a train of gears comprising a gear 112 on the indicator shaft, a pinion 113 and a gear 114 driving a pinion 115 which in turn drives the ratchet mechanism of the governor 110.

Means are provided for releasing the clutch 37 when the indicator hand comes into register with the preselector finger 70, this, of course, disconnecting the indicator shaft and arm from the metering mechanism and permitting the return spring 105 to react and return the indicating hand to zero. The mechanism for so releasing the clutch 37 includes a solenoid 120 having a horizontal movable armature 121. This armature is drawn into the winding of the solenoid when the solenoid is energized and when the solenoid is deenergized is withdrawn from the winding by a spring 122 which, as best shown in Figs. 7 and 8, is secured at one end to the solenoid and at its other end is secured to a slide 123, this slide being guided in a guide bracket 124 mounted on the bracket 53 and being connected by a pin 125 with the outer end of the armature 121, as best shown in Figs. 7, 8 and 3. The slide 123 carries a dog or pawl 126 the tooth of which is yieldingly held in a depressed position by a small spring 127 and the tooth of the pawl 126 is arranged in the path of the teeth of the ratchet wheel 40.

In Fig. 7 this armature is shown in a deenergized position. When the solenoid 120 is energized its armature 121 is drawn horizontally to the right as viewed in Fig. 7, thereby moving the slide 123 to the right and moving the pawl 126 into engagement with the teeth of the ratchet wheel 40 and rotating this wheel 40 clockwise, as viewed in Fig. 7, the parts therefore assuming the position illustrated in Fig. 8. The ratchet wheel 40 is therefore rotated a short distance and inasmuch as this ratchet wheel pivots the three small segmental gears 43 mounted thereon and inasmuch as these gears mesh with the teeth of the now stationary pinion 39, these small segmental gears 43 are rotated so as to move the salient portions of their cam extensions out of engagement with the inside face of the head 41 and thereby break the driving connection between the pinion 39 and this head 41, thus disconnecting the indicator shaft from the metering mechanism within the casing 21. As soon as this occurs the return spring 105 which has been wound up during the metering operation reacts to return the indicator hand 50 to its zero position upon which the circuit through the solenoid 120 is broken by a switch indicated generally at 128, as hereinafter described, so that its armature 125 and the slide 123 are moved to the left by the spring 122 and the pawl or dog 126 is moved out of engagement with the teeth of the ratchet wheel 40. Upon so releasing the ratchet wheel 40 its spring 45 moves it counter-clockwise, as viewed in Figs. 7 and 8, relative to the now stationary pinion 39 so that the segmental gears 43 are rotated to the position in which their salient cam portions engage the inner face of the head 41 and establish a driving connection between this head and the gear 39 and thereby reestablish a driving connection between the indicator hand 50 and the metering mechanism within the meter casing 21. The switch 128 is normally closed and is thrown by the indicator hand 50 to its open position when the indicator hand reaches its zero position. For this purpose, as best illustrated in Figs. 3, 5, and 6, the switch 128 comprises a capsule 129 carried by a clip on the upper end of an arm 130 which is pivotally mounted on a slidable adjusting block 131, this block being slidable horizontally along a bracket 132, this bracket being carried by the dial 51. The arm 130 is normally held in its extreme right hand position, as shown in Fig. 6, by a spring 133 which connects this arm with the bracket 132. In this position the globule of mercury inside the capsule connects the contacts of the switch so that the switch is closed. As the indicator hand 50 approaches its zero position it strikes a pin 134 projecting laterally forward and throws the capsule to the position illustrated in Fig. 5 so that the Mercoid switch is opened. It will be understood that the adjusting block 131 is adjusted so that the switch 128 is opened at the precise moment that the indicator hand 50 reaches its zero position on the dial.

Positive means are also provided for preventing the indicator hand from returning beyond its zero position, this stop being best illustrated in Fig. 9. For this purpose a snail cam 135 having an abrupt stop shoulder 136 is fixed on the indicator shaft 38. An adjustable stop screw 137 rides along the scroll of this cam and has its end arranged to engage the stop 136 when the indicator hand 50 reaches its zero position. In order to permit the screw 137 to traverse the scroll of the cam this screw is mounted in a pivot block 138 which in turn is pivoted to the bracket 53 held in engagement with the scroll by a spring 139.

Figure 2:
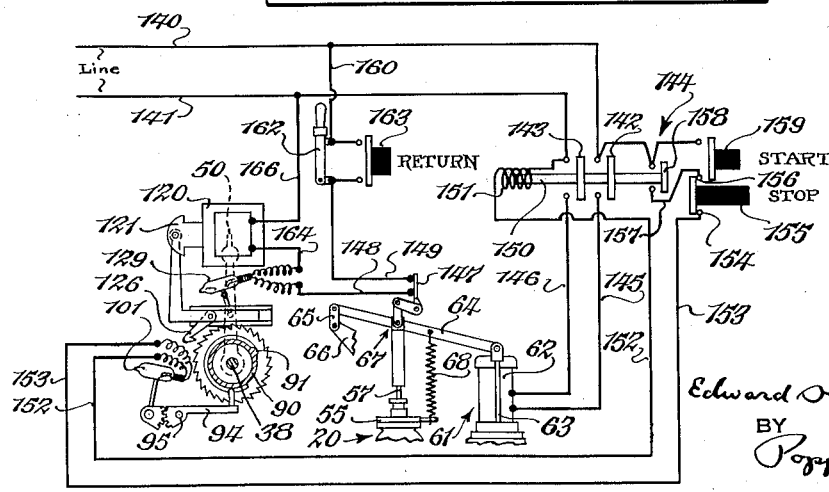
Fig. 2 is a wiring diagram of the electric power and control system.

Referring now to the wiring diagram shown in Fig. 2, the numerals 140 and 141 represent the power lines through which alternating current, at say 110 volts, is supplied. These two power lines are connected by a pair of contactors 142 and 143 of a main switch 144 with the lines 145 and 146 connecting with the thruster motor 62. When the thruster motor is so energized through the switch 144 it opens a switch 147 between lines 148 and 149 of the indicator hand return circuit hereinafter described.

The contactors 142 and 143 are mounted on the armature 150 of a holding relay, the winding 151 of which is connected at one end to the main line 141 and at its other end to a line 152, this line 152 connecting with one of the contacts of the Mercoid preselector switch 101. The other contact of this switch connects with a line 153 with a contact 154 of a stop button 155 which normally closes the circuit between this contact and the contact 156 in a line 157 which is connected by a holding contactor 158 with the main power line 140 when the holding relay is energized. The holding relay is energized by pushing a start button which connects the main power line 140 with the line 156. Since the switch 101 is normally closed it is apparent that upon pressing the start button 159 current will flow from the line 140 across the start and stop buttons 159 and 155 to the line 153 through the switch 101 and line 152 to the winding 151 of the holding relay and back to the other side 141 of the main line. When the winding 151 of the holding relay is thus energized it draws its armature 150 and its contactors 142, 143 and contactor switch 158 into their closed positions. Current is therefore supplied to the thruster motor 62 from the line 140 through contactor 142, line 145, thruster motor 62, line 146, contactor 143 to the other side 141 of the line. At the same time current is supplied from the line 140 through the holding contactor 158 to line 157 and thence across the stop button 155 and through line 153, switch 101, line 152 and winding 151 to the other side 141 of the line. It is therefore apparent that the holding relay maintains the circuit through the thruster motor 62 until the circuit is broken either at the stop button 155 or at the switch 101.

Current is also supplied from the line 140 through a line 160 which is connected with a line 149 either by means of a knife switch 162 or by means of a return button 163. The line 149 is connected by the switch 147 with the line 148 and the line 148 connects with one contact of the zero limit switch 129. The other contact of this zero limit switch 129 is connected by a line 164 with the winding of the solenoid 120, the other end of this winding being connected by a line 166 with the other side 141 of the line.

*Operation*

In the normal operation of the meter the knife switch 162 is permanently closed and the circuit is in the condition shown in Fig. 2. Assuming that it is desired to have the meter deliver, say, three gallons of material, the operator turns the preselector knob 78 to set the preselector finger 70 at the numeral 3 on the dial 51. This is effected through the shaft 77, bevel gears 76 and 75, shaft 74 and gear 73 meshing with the internal gear carrying the preselector finger 70. The setting of the preselector finger 70 in this manner also rotates the pinions 80, 82, 84 and 85 so as to turn the screw shaft 86 and move the slide 96 a corresponding distance rearwardly along the cam drum 90. This carrier carries the switch 101 which is opened when the arm 94 engages the screw cam 91 on the drum 90. Since this screw cam 91 is of helical form it is apparent that by moving the carrier 96 lengthwise of the drum 90 the relation between the switch 101 and the screw cam 91 is adjusted and that the further this slide is moved rearwardly the greater the rotation of the drum 90 before its screw cam throws the switch 101 so as to break the circuit.

To start the mechanism the operator presses the start button 159 and current is admitted from the main line 140 across the start and stop buttons 159, 155 through the line 153, closed switch 101, line 152 and winding 151 of holding relay 144 to the other side 141 of the line. This energizes the holding relay and its armature 150 is drawn so that its contactors 143, 142 and 158 are moved to close the circuits across their respective contacts. Assuming that the operator immediately releases the start button 159, current will continue to flow from the main line 140 across the holding contactor 158, through line 157, across stop switch 155 and through line 158, closed switch 101, line 152 and winding 151 to the other side 141 of the line. It is therefore apparent that the energization of the winding 151 of the holding relay is continued until the switch 101 is opened and since in the energized condition of the holding relay 141 the contactors 143 and 142 connect the thruster motor 62 across the line, this thruster motor is energized and lifts and holds the lever 64 in an elevated position until the circuit through the switch 101 is broken. The elevation of the lever 64 opens the main valve 20 and permits the liquid under pressure to be delivered through the meter 21 and thereby discharged through the outlet line 22. At the same time the elevation of the lever 64 by the thruster motor opens the switch 147.

As the liquid flows through the casing 21 it operates the metering mechanism therein, this mechanism rotating the shaft 23, gears 25, 26, shaft 27, gears 28, 29, shaft 30, worm 31, worm wheel 32, shaft 33 and gears 34, 35. The rotation of the gear 35 rotates the hub 36 and the gear 39 formed thereon and the rotation of the gear 39, through the cam faces on the three small segmental gears 43, mounted on the ratchet wheel 40, drives the head 42 of the clutch 37 and since this head is mounted on the indicator shaft 38 the indicator hand 50 is moved along the dial 51. The moment that the indicator hand 50 leaves its zero position it releases the pin 134 and permits the spring 133 to swing the arm 130 thereby throwing the switch 129 to its closed position.

At the same time the inner drum 106 carried by the indicator shaft 38 is rotated so as to wind up the spring 105, this spring being connected at one end to this drum and at its other end to a stationary part of a frame. At the same time the rotation of the indicator shaft 38 rotates the screw cam drum 90 carried by this shaft so that this drum 90 slowly turns until its screw cam 91 engages the end of the arm 94 which operates the switch 101.

As previously stated the carrier 96 which carries the switch 101 is adjusted along the cam drum 90 in accordance with the setting of the preselector finger 70, and the relation between the form of the screw cam 91 on the drum is such that the moment the indicator hand 50 comes into register with the preselector hand 70 the screw cam 91 on the drum throws the arm 94 so as to rotate the segmental gear 99 and throw the switch 101 to its open position, as shown in Fig. 12. An extremely accurate adjustment of this relation between the screw cam 91 and the registry of the indicator hand 50 and preselector finger 70 can be obtained by drawing the gears 80 and 82 forwardly with one's fingers against the resistance of the spring 83, as shown in Figs. 4 and 14, this withdrawal disengaging the gear 82 from the train of gears 84, 85 and permitting these gears 80, 82 to be turned as many teeth as is necessary to obtain the desired relation between the preselector hand and the screw shaft 86, this turning of the gears 80, 82 turning the internal gear 71 but not the screw shaft 86. When the correct relation has been obtained the gears 80, 82 are released and the spring 83 moves the gears 80, 82 rearwardly so as to reestablish a driving relation between the gear 82 and the train of gears 84, 85 which drive the screw shaft 86. It will be understood that such an adjustment is only required when setting up the machine or in readjusting it during repairs.

The moment that the indicator hand 50 and the preselector finger 70 come into register the corresponding part of the screw cam 91 throws the lever 94 (Fig. 12) and opens the switch 101. Immediately the circuit through the winding 151 of the holding relay 144 is broken and the contactors 142 and 143 move to break the circuit through the thruster motor 62. With the deenergization of the thruster motor 62, the lever 64 held in an elevated position by the thruster immediately drops and closes the valve 20 so as to cut off the further flow of liquid through the meter. At the same time the switch 147 is closed and a circuit is established from main line 140, through line 160, closed knife switch 162, line 149, switch 147, line 148, switch 129 (which in all positions of the indicator hand 50 other than zero is closed), line 164, solenoid 120 and through line 166 to the other side 141 of the line. The energization of the solenoid 120 draws its armature 121 inwardly and through the pin 125 moves the slide 123 to the right, as indicated in Fig. 8. This causes the dog 126 carried by the slide to engage the teeth of the ratchet wheel 40 and rotate this ratchet wheel a sufficient distance to cause a slight rotation of its segmental gears 43 relative to the now stationary pinion 39 so as to move the salient portions of the cams on these gears out of engagement with the head 42. This slight rotation of the ratchet wheel 40 and its segmental gears relative to the now stationary gear 39 therefore breaks the driving connection between the metering mechanism in the casing 20 and the indicator shaft 38 and releases the indicator shaft completely. When this occurs the return spring 105 which has been wound up during the metering operation reacts to rotate its drum 106 and the indicator shaft 38 so as to move the indicator hand 50 back to its zero position. This return movement of the indicator shaft and its hand is dampened by the governor 110, best illustrated in Fig. 13.

The moment the indicator hand 50 reaches its zero position it strikes the pin 134 and throws the switch 129 to its open position against the resistance of the small spring 133. This breaks the circuit through the solenoid 120 and permits the spring 122 to move the parts to the original position shown in Fig. 7, in which the dog 126 is out of engagement with the teeth of the ratchet wheel 40. Therefore when the indicator hand 50 reaches its zero position the entire metering mechanism is returned to its normal condition and is in condition for another cycle of operations as above described.

Under some conditions of operation it may be desirable not to effect an automatic return of the indicator hand 50 to its zero position but to have this hand held in registry with the preselector finger 70 until the operator deliberately resets the indicator hand to its zero position. This might be desirable in dispensing gasolene, for example, where the purchaser might wish to check on the gallonage delivered before the indicator hand returns to zero. When this is desired the knife switch 162 (Fig. 2) is opened. With this switch 162 open it is apparent that the circuit through the solenoid 120 is open until the operator deliberately presses the return button 163. Therefore this solenoid is not energized so as to release the clutch 37 and permit the return spring 105 to move the indicator hand back to zero until the operator presses the return button 163 and permits current to flow from line 140, through lines 160, 149, closed switch 147, line 148, closed switch 129, line 164, solenoid 120 and through line 166 to the other side 141 of the line. It will therefore be seen that by the simple provision of the return button 163 and knife switch 162 across the line 160, 149 the mechanism can be easily adapted either to an automatic return of the indicator hand to zero position or to a manual return thereof.

From the foregoing it is apparent that the present invention provides an extremely simple, compact, inexpensive and accurate meter in which the amount to be delivered can be preselected and which will deliver the preselected volume of the liquid and automatically restore the parts to their original normal condition or can be readily adapted so as to require the operator to press an indicator hand return button to effect such restoration. It will also be noted that the meter avoids the necessity of an electric return motor for the indicator hand and also avoids the necessity of using relatively complicated magnetic clutches and instead substitutes therefor a simple cam clutch and a return spring which is automatically wound up during the metering operation. It will further be observed that by the provision of the drum 90 having a screw cam and by adjustably moving the preselector switch 101 along this drum in accordance with the preselected quantity of liquid desired, very simple and accurate means are provided for insuring the delivery of the preselected volume of liquid.

I claim as my invention:

1. In a fluid metering system of the character described, metering means, a calibrated member, an indicator traversing said calibrated member and driven by said metering means and indicating the volume of fluid being delivered, means yieldingly urging said indicator to return to its zero position on said calibrated member, a preselector member traversing said calibrated member and adapted to be manually set to a position indicating the volume of fluid desired to be delivered, a clutch between said metering means and indicator and means set by said preselector member for stopping the flow of fluid through said metering means and disengaging said clutch when said indicator reaches the calibration indicating the volume which said preselector member has been set to deliver thereby to permit said indicator to be returned to zero by said yielding return means.

2. In a fluid metering system of the character described, metering means, a calibrated member, an indicator traversing said calibrated member and driven by said metering means and indicating the volume of liquid being delivered, means yielding urging said indicator to return to its zero position on said calibrated member, a preselector member adapted to be set to a position indicating the volume of fluid desired to be delivered, a clutch between said metering means and indicator and adapted, when disengaged, to permit said indicator to be returned to zero by said yielding return means, means for operating said clutch including a solenoid, switch means stopping the flow of fluid through said metering means, and also closing the circuit through said solenoid, means for setting said switch means in response to the movement of said preselector member and means actuated in response to the movement of said indicator for actuating said switch means when said indicator reaches the calibration indicating the volume which said preselector member has been set to deliver.

3. In a fluid metering system of the character described, metering means, a calibrated member, an indicator traversing said calibrated member and driven by said metering means and indicating the volume of fluid being delivered, means yieldingly urging said indicator to return to its zero position on said calibrated member, a preselector member adapted to be set to a position indicating the volume of fluid desired to be delivered, a clutch between said metering means and indicator and adapted, when disengaged, to permit said indicator to be returned to zero by said yielding return means, switch means for stopping the flow of fluid through said metering means, means for setting said switch means in response to the movement of said preselector member, means actuated in response to the movement of said indicator for actuating said switch means when said indicator reaches the calibration indicating the volume which said preselector member has been set to deliver and means for disengaging said clutch.

4. In a fluid metering system of the character described, metering means, a calibrated member, an indicator traversing said calibrated member and driven by said metering means and indicating the volume of fluid being delivered, means yieldingly urging said indicator to return to its zero position on said calibrated member, a preselector member adapted to be set to a position indicating the volume of fluid desired to be delivered, a clutch between said metering means and indicator and adapted, when disengaged, to permit said indicator to be returned to zero by said yielding return means, switch means for stopping the flow of fluid through said metering means, means for setting said switch means in response to the movement of said preselector member, means actuated in response to the movement of said indicator for actuating said switch means when said indicator reaches the calibration indicating the volume which said preselector member has been set to deliver and means for disengaging said clutch including a solenoid and a switch controlling said solenoid.

5. In a fluid metering system of the character described, metering means, a calibrated member, an indicator shaft driven by said metering means, an indicator on said indicator shaft and traversing said calibrated member and indicating the volume of fluid being delivered, means yieldingly urging said indicator to return to its zero position on said calibrated member, a preselector member adapted to be set to a position indicating the volume of fluid desired to be delivered, switch means for stopping the flow of fluid through said metering means, means for setting said switch means in response to the movement of said preselector member, means actuated in response to the movement of said indicator for actuating said switch means when said indicator reaches the calibration indicating the volume which said preselector member has been set to deliver, a clutch between said indicator shaft and metering means and adapted, when disengaged, to permit said indicator to be returned to zero by said yielding return means, a solenoid disengaging said clutch and means for energizing said solenoid.

6. In a fluid metering system of the character described, metering means, a calibrated member, an indicator shaft driven by said metering means, an indicator on said indicator shaft and traversing said calibrated member and indicating the volume of fluid being delivered, means yieldingly urging said indicator to return to its zero position on said calibrated member, a preselector member adapted to be set to a position indicating the volume of fluid desired to be delivered, switch means for stopping the flow of fluid through said metering means, means for setting said switch means in response to the movement of said preselector member, means actuated in response to the movement of said indicator for actuating said switch means when said indicator reaches the calibration indicating the volume which said preselector member has been set to deliver, a clutch between said indicator shaft and metering means and comprising a driving member loosely mounted on said shaft and driven by said metering means, a driven member fast to said shaft, an intermediate member loosely mounted on said shaft and carrying cam members movable on turning said intermediate member to establish a driving connection between said driving and driven clutch members, a solenoid, means for turning said intermediate member through motion derived from said solenoid and means for energizing said solenoid.

7. In a fluid metering system of the character described, metering means, a calibrated member, an indicator shaft driven by said metering means, an indicator carried by said shaft and traversing said calibrated member and indicating the volume of fluid being delivered, a return spring surrounding said shaft and having one end secured to said shaft and its other end secured to a stationary part whereby said spring is wound up during the metering operation, a preselector member traversing said calibrated member and adapted to be manually set to a position indicating the volume of fluid desired to be delivered, a clutch between said metering means and shaft and means set by said preselector member for stopping the flow of fluid through said metering means and disengaging said clutch when said indicator reaches the setting of said preselector member, thereby to permit said indicator to be returned to zero by said spring.

8. In a fluid metering system of the character described, metering means, a calibrated member, an indicator traversing said calibrated member and driven by said metering means and indicating the volume of fluid being delivered, means yieldingly urging said indicator to return to its zero position on said calibrated member, a preselector member adapted to be set to a position indicating the volume of fluid desired to be delivered, a clutch between said metering means and indicator, means set by said preselector member for stopping the flow of fluid through said metering means and disengaging said clutch when said indicator reaches the calibration indicating the volume which said preselector member has been set to deliver thereby to permit said indicator to be returned to zero by said yielding return means, and a governor retarding the return movement of said indicator.

9. In a fluid metering system of the character described, metering means, an electrically actuated valve for stopping the flow of fluid through said metering means, a calibrated member, an indicator shaft driven by said metering means, an indicator hand carried by said shaft and traversing said calibrated member, a helical cam rotating with said shaft, a switch adapted to be tripped by said cam and in circuit with said electrically actuated valve, a preselector member adapted to be set to a position indicating the volume of fluid desired to be delivered and means actuated by the movement of said preselector member for moving said switch lengthwise of the axis of said helical cam to cause said cam to actuate said switch when said indicator reaches the setting of said preselector member.

10. In a fluid metering system of the character described, metering means, an electrically actuated valve for stopping the flow of fluid through said metering means, a calibrated member, an indicator shaft driven by said metering means, an indicator hand carried by said shaft and traversing said calibrated member, a helical cam mounted on said shaft and rotating therewith, a switch mounted for movement parallel with the axis of said helical cam and adapted to be tripped by said cam, said switch being in circuit with said electrically actuated valve, a preselector member adapted to be set to a position indicating the volume of fluid desired to be delivered and means actuated by the movement of said preselector member for moving said switch lengthwise of the axis of said helical cam to cause said cam to actuate said switch when said indicator reaches the setting of said preselector member.

11. In a fluid metering system of the character described, metering means, an electrically actuated valve for stopping the flow of fluid through said metering means, a calibrated member, an indicator shaft driven by said metering means, an indicator hand carried by said shaft and traversing said calibrated member, a helical cam rotating with said shaft, a rotatable screw journalled parallel with the axis of said helical cam, a carrier having threaded engagement with said screw and adjusted lengthwise of the axis of said cam on turning said screw, a switch carried by said carrier and adapted to be tripped by said cam and in circuit with said electrically actuated valve, a preselector member adapted to be set to a position indicating the volume of fluid desired to be delivered and means actuated by the movement of said preselector member for turning said screw to move said carriage lengthwise thereof thereby to cause said cam to actuate said switch when said indicator reaches the setting of said preselector member.

12. In a fluid metering system of the character described, metering means, a calibrated dial, an indicator shaft concentric with said dial and driven by said metering means, an indicator hand carried by said shaft and traversing said dial to indicate the volume of fluid being delivered, an internal gear rotatably mounted concentric with said dial and adapted to be manually turned, a preselector member carried by said internal gear and traversing said dial, a cam actuated in response to the movement of said shaft, an electrically actuated valve for stopping the flow of fluid through said metering means, a switch movably mounted in the path of said cam and in circuit with said electrically actuated valve, gear means meshing with said internal ring gear and means actuated by said last named gear means for moving said switch relative to said cam to cause said cam to trip said switch when said indicator hand reaches the setting of said preselector member.

13. In a fluid metering system of the character described, metering means, a calibrated dial, an indicator shaft concentric with said dial and driven by said metering means, an indicator hand carried by said shaft and traversing said dial to indicate the volume of fluid being delivered, an internal gear rotatably mounted concentric with said dial and adapted to be manually turned, a preselector member carried by said internal gear and traversing said dial, a cam actuated in response to the movement of said shaft, an electrically actuated valve for stopping the flow of fluid through said metering means, a switch movably mounted in the path of said cam and in circuit with said electrically actuated valve, gear means meshing with said internal ring gear, means actuated by said last named gear means for moving said switch relative to said cam to cause said cam to trip said switch when said indicator hand reaches the setting of said preselector member and means for manually turning said internal gear comprising a rotatable adjusting knob and gears connecting said knob and the teeth of said internal gear.

14. In a fluid metering system of the character described, metering means, a calibrated dial, an indicator shaft concentric with said dial and driven by said metering means, an indicator hand traversing said dial to indicate the volume of fluid being delivered, an internal gear rotatably mounted concentric with said dial and adapted to be manually turned, a preselector member carried by said internal gear and traversing said dial, a helical cam rotating with said shaft, a rotatable screw journalled parallel with the axis of said helical cam, a carrier having threaded engagement with said screw and adjusted lengthwise of the axis of said cam on turning said screw, an electrically actuated valve for stopping the flow of fluid through said metering means, a switch carried by said carrier and adapted to be tripped by said cam and in circuit with said electrically actuated valve, and gearing engaging the teeth of said internal gear and rotating said screw to cause said cam to actuate said switch when said indicator reaches the setting of said preselector member.

EDWARD HAROLD BRAYER.